United States Patent [19]

Yoldas et al.

[11] Patent Number: 4,754,012
[45] Date of Patent: Jun. 28, 1988

[54] MULTI-COMPONENT SOL-GEL PROTECTIVE COATING COMPOSITION

[75] Inventors: Bulent E. Yoldas, Pittsburgh; Chia-Cheng Lin, Gibsonia, both of Pa.

[73] Assignee: PPG Industries, Inc., Pittsburgh, Pa.

[21] Appl. No.: 914,860

[22] Filed: Oct. 3, 1986

[51] Int. Cl.$^4$ ............................................. C08G 77/00
[52] U.S. Cl. ........................................ 528/10; 528/29; 528/30; 528/25; 528/21; 427/387
[58] Field of Search .................. 528/25, 30, 29, 10, 528/21; 427/387

[56] References Cited

U.S. PATENT DOCUMENTS

| | | | |
|---|---|---|---|
| 3,004,863 | 10/1961 | Gray, Jr. et al. | 117/94 |
| 3,582,395 | 6/1971 | Adams et al. | 117/124 |
| 3,941,719 | 3/1976 | Yoldas | 252/463 |
| 3,944,658 | 3/1976 | Yoldas | 423/626 |
| 3,986,997 | 10/1976 | Clark | 260/29.2 |
| 4,027,073 | 5/1977 | Clark | 428/412 |
| 4,042,749 | 8/1977 | Sandvig | 427/54.1 |
| 4,073,967 | 2/1978 | Sandvig | 427/322 |
| 4,208,475 | 6/1980 | Paruso et al. | 429/193 |
| 4,242,403 | 12/1980 | Mattimoe et al. | 428/213 |
| 4,244,986 | 1/1981 | Paruso et al. | 427/126.4 |
| 4,271,210 | 6/1981 | Yoldas | 427/169 |
| 4,275,118 | 6/1981 | Baney et al. | 428/412 |
| 4,278,632 | 7/1981 | Yoldas | 264/66 |
| 4,286,024 | 8/1981 | Yoldas | 428/446 |
| 4,293,594 | 10/1981 | Yoldas et al. | 427/107 |
| 4,357,427 | 11/1982 | Ho et al. | 501/153 |
| 4,390,373 | 6/1983 | White et al. | 106/287 |
| 4,405,679 | 8/1983 | Fujioka et al. | 428/216 |
| 4,442,168 | 4/1984 | White et al. | 428/331 |
| 4,477,499 | 10/1984 | Doin et al. | 427/412 |
| 4,500,669 | 2/1985 | Ashlock et al. | 524/440 |
| 4,568,578 | 2/1986 | Arfsten et al. | 428/34 |
| 4,571,365 | 2/1986 | Ashlock et al. | 428/412 |

FOREIGN PATENT DOCUMENTS 0128697 12/1984 European Pat. Off. .
0170295 2/1986 European Pat. Off. .
1494209 12/1977 United Kingdom .

OTHER PUBLICATIONS

*Physics of Thin Films*, vol. 5, pp. 134–139 (1969).
*Journal of Applied Polymer Science*, vol. 26, pp. 2381–2389 (1981).
*Journal of Non-Crystalline Solids*, vol. 63 (1984), pp. 283–292.
*Polymer Bulletin*, No. 14 (1985).

*Primary Examiner*—Melvyn I. Marquis
*Attorney, Agent, or Firm*—Donna L. Seidel

[57] ABSTRACT

A multi-component organoalkoxysilane/metal alkoxide sol-gel composition and method for its production are disclosed whereby an organoalkoxysilane of the general formula

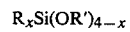

$$R_x Si(OR')_{4-x}$$

wherein R is an organic radical, R' is low molecular weight alkyl radical, and x is at least 1 and less than 4, is partially hydrolyzed, reacted with a mixture of metal alkoxides, and the resulting composition is further hydrolyzed and condensed to form an inorganic oxide network. The composition is dried and cured to form an abrasion-resistant coating on a substrate having improved properties in comparison with single metal alkoxide compositions.

20 Claims, No Drawings

MULTI-COMPONENT SOL-GEL PROTECTIVE COATING COMPOSITION

FIELD OF THE INVENTION

The present invention relates generally to the art of abrasion resistant coatings, and more particularly, to the art of organosiloxane coatings containing alumina, titania or zirconia.

BACKGROUND OF THE INVENTION

U.S. Pat. No. 3,004,863 to Gray et al teaches increasing the scratch resistance of glass by applying to the glass surface an acidic aqueous solution of an organic titanate ester composition and heating at a temperature sufficient to anneal the glass.

U.S. Pat. No. 3,582,395 to Adams et al discloses a method for increasing the scratch resistance of glass by treating the surface at a temperature between the strain point and the softening point with an alkylsilyl titanate to form a protective coating of silica-titania.

U.S. Pat. No. 4,242,403 to Mattimoe et al describes multilayer automotive glazing units that include transparent substrates with protective covers, and that combine penetration resistant body portions with abrasion resistant surfaces of a silica-reinforced organopolysiloxane.

U.S. Pat. No. 4,275,118 to Baney et al discloses a coating composition comprising an acidic dispersion of colloidal titania, colloidal silica and hydroxylated silsesquioxane in an alcohol-water medium which produces a hard, abrasion-resistant coating when cured on a plastic substrate such as polycarbonate.

European patent application No. 85110293.9 published 05.02.86 discloses carbon-containing monolithic glasses prepared by a sol-gel process involving a partial condensate of a silanol containing colloidal metal oxides such as $SnO_2$, $B_2O_3$ and $ZnO_2$.

U.S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. Nos. 4,500,669 and 4,571,365 to Ashlock et al disclose transparent, abrasion-resistant coating compositions comprising a colloidal dispersion of a water-insoluble dispersant in a water-alcohol solution of the partial condensate of silanol wherein the dispersant comprises metals, alloys, salts, oxides and hydroxides thereof.

U.S. Ser. No. 915,344 to Lin et al, and U.S. Ser. No. 914,856 to Yoldas et al filed on even date herewith disclose silane/alumina, silane/titania and silane/zirconia sol-gel coating compositions. These coatings improve the abrasion resistance of surfaces of organic polymers such as acrylic and polycarbonate.

SUMMARY OF THE INVENTION

The present invention, in addition to providing abrasion resistance, involves also optimizing a variety of properties such as alkali resistance, adhesive strength, chemical resistance, water stability and index of refraction for optical coatings. The present invention requires a multi-component system combining an organoalkoxysilane composition with a combination of other components such as hydrolyzable alkoxides of aluminum, titanium, tantalum, hafnium and the like to form an inorganic oxide polymer network optimizing overall performance. The organoalkoxysilane/mixed metal alkoxides composition can be coated on glass, metals and ceramics, as well as on plastics, not only for abrasion resistance, but also for chemical resistance, e.g., to alkali or oxidation. The organoalkoxysilane/mixed metal alkoxides composition may also function as a carrier and binder for pigments to form opaque and/or colored coatings. An important feature of the present invention is that the proportion of metal alkoxides can be selected to produce a coating with a desired refractive index, e.g., to match a transparent substrate.

DESCRIPTION OF THE PREFERRED EMBODIMENT

A multi-component organoalkoxysilane/mixed metal alkoxides composition is prepared in accordance with the present invention in order to provide a coating with superior abrasion resistance, as well as alkali resistance and chemical resistance, which can be pigmented and coated on metal, ceramic and glass surfaces, as well as on plastics, and the refractive index of which may be matched to that of a transparent substrate for optical applications.

Preferably, an organoalkoxysilane is first at least partially hydrolyzed by adding a less than equivalent quantity of water to an organoalkoxysilane in solution, preferably in alcohol. The organoalkoxysilane preferably has the general formula

$$R_xSi(OR')_{4-x}$$

wherein R is an organic radical, R' is low molecular weight alkyl radical, and x is at least one and less than 4; preferably x is 1, so that the organoalkoxysilane has three hydrolyzable sites. The organic radical R is preferably a lower ($C_1$ to $C_6$) alkyl or vinyl, methoxyethyl, phenyl, γ-glycidoxypropyl or γ-methacryloxypropyl. Preferably about one mole of water per mole of organoalkoxysilane is added in alcohol medium to partially hydrolyze the organoalkoxysilane according to the general reaction

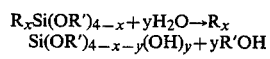

$$R_xSi(OR')_{4-x} + yH_2O \rightarrow R_xSi(OR')_{4-x-y}(OH)_y + yR'OH$$

After the organoalkoxysilane is partially hydrolyzed, additional metal ions are incorporated in the composition by adding hydrolyzable metal alkoxides to the partially hydrolyzed organoalkoxysilane. Preferably, these additional metal alkoxides include alkoxides of the general formula

$$M(OR'')_z$$

wherein M is a metal selected from the group consisting of aluminum, titanium, zirconium and mixtures thereof, z is the valence of M and R'' is a low molecular weight alkyl radical, preferably ethyl, propyl or butyl. In addition to aluminum, titanium and/or zirconium, other metal alkoxides including such metals as tantalum, hafnium, etc., may be employed. The metal alkoxide may include an alkyl or aryl group or be in dimer or higher condensed form so long as hydrolyzable alkoxy groups remain reactive with silanol groups of the partially hydrolyzed organoalkoxysilane to copolymerize.

When metal alkoxides or alkylalkoxides are introduced into the partially hydrolyzed organoalkoxysilane, the hydrolyzable alkoxy groups react with the hydroxyl bonds of the partially hydrolyzed organoalkoxysilane, condensing to form an inorganic oxide network and producing alcohol according to the general reaction:

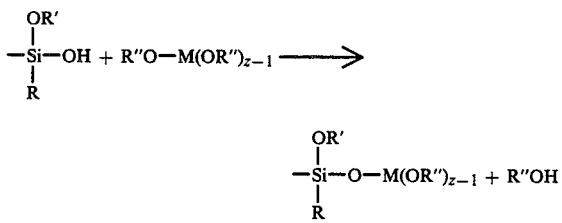

Once the metal alkoxide is reacted with the organoalkoxysilane by this reaction, the composition may be fully hydrolyzed by the addition of water, converting the alkoxy groups OR′ and OR″ to hydroxyl groups without precipitation of insoluble metal hydroxides. Condensation polymerization proceeds to extend the inorganic oxide network. The composition may then be diluted with either water, alcohol or other suitable solvent to the concentration desired for applying a coating to a substrate. Using titanium alkoxides in conjunction with zirconium, aluminum and silicon alkoxides in various ratios provides coatings with refractive indices within the range of 1.4 to 1.85 for optical coating applications.

The present invention will be further understood from the description of specific examples which follow.

EXAMPLE I

A partially hydrolyzed organoalkoxysilane sol is prepared by combining 100 grams of γ-glycidoxypropyl trimethoxysilane

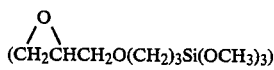

in 100 grams of ethanol with 8 grams of water and 0.2 grams of nitric acid and stirring for 10 minutes at ambient temperature. To this partially hydrolyzed organoalkoxysilane are added 20 grams of zirconium n-propoxide (Zr(OC$_3$H$_7$)$_4^n$) and 10 grams of titanium ethoxide (Ti(OC$_2$H$_5$)$_4$). The composition is stirred at ambient temperature for 20 minutes to allow copolymerization of the metal alkoxides with the partially hydrolyzed organoalkoxysilane. Finally, 20 grams of water and an additional 60 grams of ethanol are added to fully hydrolyze the composition and dilute it for coating application.

A polycarbonate substrate is cleaned and primed by dipping in aminosilane (A1120 from Union Carbide) for 7 minutes, rinsing in 2-propanol then water, and drying for 30 minutes at 60° C. to 80° C. The primed polycarbonate is then coated by dipping into the coating composition of this example for 1 minute, drying in air at ambient temperature and curing at 130° C. for 2 hours. The index of refraction of the coating is 1.6 compared to 1.54 for a comparable coating without the titanium.

EXAMPLE II

A partially hydrolyzed organoalkoxysilane composition is prepared by combining 55 grams of γ-glycidoxypropyl trimethoxysilane

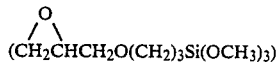

and 35 grams of tetramethyl silicate (Si(OCH$_3$)$_4$) in 100 grams of ethanol and adding 3 grams of water and 0.3 grams of nitric acid. The nitric acid is necessary to hydrolyze the tetramethyl silicate. The solution is stirred for 10 minutes before adding 15 grams of zirconium isopropoxide (Zr(OC$_3$H$_7$)$_4^i$), 15 grams of tetraethyltitanate (Ti(OC$_2$H$_5$)$_4$) and 15 grams of aluminum tributoxide (Al(OC$_4$H$_9$)$_3$). After stirring another 20 minutes to allow the metal alkoxides to react with the partially hydrolyzed organoalkoxysilane, an additional 20 grams of water and 30 grams of ethanol are added to complete hydrolysis and bring the concentration to a suitable level for coating.

A polycarbonate sample coated with the above composition and cured at 130° C. for 2 hours has 4.3 percent haze after 300 cycles of Bayer abrasion testing according to ASTM F-735 using 1000 grams of quartz sand in the 6 to 14 mesh size range, compared with 60 to 65 percent haze for uncoated polycarbonate after 300 cycles of Bayer abrasion testing.

EXAMPLE III

A partially hydrolyzed organoalkoxysilane is prepared by stirring 100 grams of γ-glycidoxypropyl trimethoxysilane

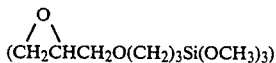

in 100 grams of ethanol and 3 grams of water for 10 minutes. A mixture of 17 grams of zirconium isopropoxide (Zr(OC$_3$H$_7$)$_4^i$) and 34 grams of tetraethyltitanate (Ti(OC$_2$H$_5$)$_4$) is added to the partially hydrolyzed organoalkoxysilane and stirred for 20 minutes to allow copolymerization. Finally, 25 grams of water and 80 grams of ethanol are added to complete hydrolysis and prepare the composition for application to a substrate.

A polycarbonate substrate is primed, coated with the above-described composition, dried and cured as in the previous example. After 300 cycles of Bayer abrasion testing, the coated substrate has 2.7 percent haze, compared with 60 to 65 percent haze for uncoated polycarbonate after 300 cycles of Bayer abrasion testing. When tested against various chemicals, the coating showed very good resistance against both acids and alkalis. By comparison, a comparable coating containing only titanium and not zirconium has comparable acid resistance but inferior alkali resistance.

EXAMPLE IV

A partially hydrolyzed organoalkoxysilane is prepared by stirring 100 grams of γ-glycidoxypropyl trimethoxysilane in 40 grams of ethanol, 8 grams of water and 0.2 grams of nitric acid for 10 minutes. Forty grams of titanium n-propoxide is added to the partially hydrolyzed organoalkoxysilane. The mixture is stirred for 20 minutes to allow copolymerization. Finally, 120 grams of water and 40 grams of ethanol are added to complete hydrolysis and adjust the concentration for coating.

A similar composition is prepared except for substituting 40 grams of zirconium n-propoxide for the titanium n-propoxide. The two solutions are mixed in various proportions and applied to silicon wafers, dried at room temperature and cured at 130° C. for 2 hours. The following table shows the refractive indices for various coating compositions.

| Sample No. | Titanium Composition (grams) | Zirconium Composition (grams) | Refractive Index |
| --- | --- | --- | --- |
| 1 | 10.0 | 0 | 1.83 |
| 2 | 6.5 | 3.5 | 1.70 |
| 3 | 3.5 | 6.5 | 1.63 |
| 4 | 0 | 10.0 | 1.55 |

EXAMPLE V

A partially hydrolyzed organoalkoxysilane is prepared by dissolving 100 grams of γ-glycidoxypropyl-trimethoxysilane in 40 grams of ethanol and hydrolyzing with 6 grams of water and 0.2 grams of nitric acid for 10 minutes. Forty grams of titanium n-propoxide is added and stirred for 20 minutes to copolymerize. Finally, 120 grams of water and 40 grams of ethanol are added to complete hydrolysis and adjust the concentration for coating. A similar composition is prepared except that the alkoxide comprises 20 grams of titanium n-propoxide and 20 grams of zirconium n-propoxide. Both compositions are coated on silicon wafers, dried at room temperature, and cured at 130° C. for 2 hours to form films about 4 micrometers thick. The coated wafers are immersed in normal sodium hydroxide at room temperature for 12 hours. Uncoated silicon wafers are attacked by alkali. The silane/titania coating is destroyed by the alkali, but the silane/zirconia/titania coating passes the alkali test.

The above examples are offered to illustrate the present invention. Various organoalkoxysilanes may be employed in accordance with the present invention in a wide range of proportions with various other metal alkoxides in different combinations and proportions to optimize desirable properties in the coating. Additives such as surfactants, ultraviolet radiation absorbers, fillers and pigments may be included in coating compositions of the present invention which may be prepared in a variety of alcohol or other organic solvents, or in essentially aqueous media as disclosed in U.S. Ser. No. 914,346 filed on even date herewith entitled "Aqueous Silane/Titania Coating Composition" by Yoldas et al, the disclosure of which is incorporated herein by reference. The scope of the present invention is defined by the following claims.

We claim:

1. A composition of matter comprising the condensation polymerization reaction product of:
    a. an organoalkoxysilane of the general formula $R_xSi(OR')_{4-x}$ wherein R is an organic radical, R' is a low molecular weight alkyl radical, and x is at least one and less than 4; and
    b. at least two metal alkoxides of the general formula $M(OR'')_z$ wherein M is a metal which hydrolyzable alkoxides, z is the valence of M, and R" is a low molecular weight alkyl radical, and said metal alkoxides comprises at least two different metals.
2. A composition according to claim 1, wherein R is selected from the group consisting of alkyl, vinyl, methoxyethyl, phenyl, γ-glycidoxypropyl and γ-methacryloxypropyl.
3. A composition according to claim 1, wherein R' and R" are individually selected from the group consisting of methyl, ethyl, propyl and butyl.
4. A composition accoridng to claim 1, wherein each said metal is selected from the group consisting of aluminum, titanium, zirconium, tantalum, hafnium and mixtures thereof.
5. A composition according to claim 1, wherein one of said metal alkoxides is zirconium isopropoxide.
6. A composition according to claim 1, wherein one of said metal alkoxides is a titanium alkoxide.
7. A composition according to claim 6, wherein said titanium alkoxide comprises $Ti(OC_2H_5)_4$.
8. A composition according to claim 1, wherein one of said metal alkoxides is an aluminum alkoxide.
9. A composition according to claim 8, wherein said aluminum alkoxide comprises aluminum tributoxide.
10. A composition according to claim 1, wherein one of said metal alkoxides is a zirconium alkoxide and one is a titanium alkoxide.
11. A method of making an organoalkoxysilane-metal oxide composition comprising the steps of:
    a. partially hydrolyzing in organic solution an organoalkoxysilane of the general formula $R_xSi(OR')_{4-x}$ wherein R is an organic radical, R" is a low molecular weight alkyl radical, and x is at least 1 and less than 4;
    b. adding to said partially hydrolyzed organoalkoxysilane at least two hydrolyzable metal alkoxides comprising at least two metals;
    c. reacting said metal alkoxides with said partially hydrolyzed organoalkoxysilane; and
    d. further hydrolyzing and condensing the composition.
12. A method according to claim 11, wherein the step of partially hydrolyzing said organoalkoxysilane is carried out in alcohol.
13. A method according to claim 12, wherein the step of partially hydrolyzing said organoalkoxysilane is carried out in ethanol.
14. A method according to claim 11, wherein one of said metal alkoxides is a zirconium alkoxide.
15. A method according to claim 14, wherein said zirconium alkoxide comprises $Zr(OC_3H_7)_4$.
16. A method according to claim 11, wherein one of said metal alkoxides is a titanium alkoxide.
17. A method according to claim 16, wherein said titanium alkoxide comprises tetraethyl titanate.
18. A method according to claim 11, wherein one of said metal alkoxides is an aluminum alkoxide.
19. A method according to claim 18, wherein said aluminum alkoxide comprises aluminum tributoxide.
20. A method according to claim 11, wherein said metal alkoxides comprise a zirconium alkoxide, a titanium alkoxide and an aluminum alkoxide.

* * * * *